A. N. HOVLAND.
RELAY.
APPLICATION FILED MAY 1, 1913. RENEWED DEC. 27, 1918.

1,293,098.

Patented Feb. 4, 1919.
4 SHEETS—SHEET 1.

Witnesses
B. N. Dommers
E. Leckert

Inventor
Abraham N. Hovland
By Henry Orth Jr.
Atty.

A. N. HOVLAND.
RELAY.
APPLICATION FILED MAY 1, 1913. RENEWED DEC. 27, 1918.
1,293,098.
Patented Feb. 4, 1919.
4 SHEETS—SHEET 2.
Fig. 9.
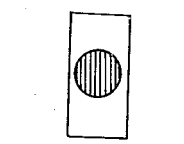
Fig. 10.
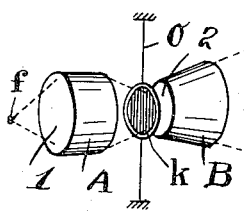
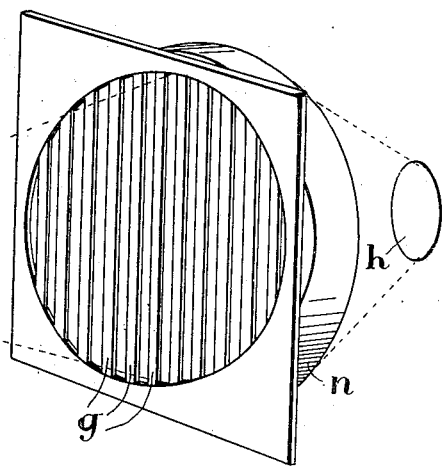
Fig. 11.
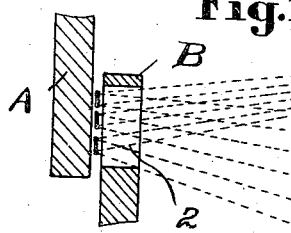
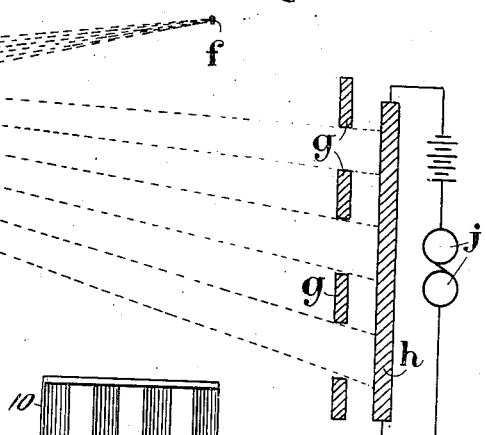
Fig. 15.
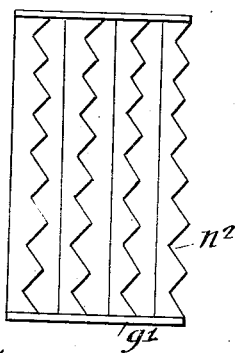
Fig. 16.
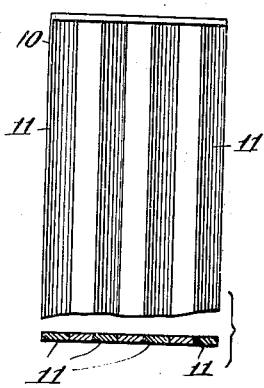
Witnesses
R. W. Sommers
E. Leckert
Inventor
Abraham N. Hovland,
By Henry N. Roth Jr.
Atty.

A. N. HOVLAND.
RELAY.
APPLICATION FILED MAY 1, 1913. RENEWED DEC. 27, 1918.

1,293,098.

Patented Feb. 4, 1919.
4 SHEETS—SHEET 4.

Inventor
Abraham Hovland
by Henry Ort Jr.
Atty

UNITED STATES PATENT OFFICE.

ABRAHAM NILSEN HOVLAND, OF CHRISTIANIA, NORWAY.

RELAY.

1,293,098. Specification of Letters Patent. Patented Feb. 4, 1919.

Application filed May 1, 1913, Serial No. 764,954. Renewed December 27, 1918. Serial No. 268,513.

*To all whom it may concern:*

Be it known that I, ABRAHAM NILSEN HOVLAND, a subject of the King of Norway, residing at Christiania, Norway, have invented certain new and useful Improvements in Relays; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is well known, that a conducting wire placed in a magnetic field will be displaced laterally when an electric current is passed through the same. This fact is made use of for instance in wire galvanometers and in light-writing apparatus, *i. e.*, telegraph apparatus, in which a thin metal wire is photographed on a running photographic strip. No one, however, has heretofore succeeded in constructing a relay device or obtaining any relay action by means of said fact.

The object of the present invention is now to make use of said property of the magnetic field to produce a very sensitive relay device using one or more photo-electric cells, for instance selenium cells. According to the present invention this is attained by using suitable means, as a grid and one or more wires placed so as to intercept the light rays thereby obtaining one or more shadow or light stripes which are used to produce a combined effect on the selenium cell, or, by placing on one or more wires a small transparent plate of glass, mica, or the like, which is provided with several dark stripes, and which is either moved laterally or swung, when a current is passing through the wire or wires. The cell is in a local or separate circuit and is the effective means for controlling the current through said circuit.

This is the characteristic feature of the present invention.

The accompanying drawing illustrates some embodiments of the invention.

Figs. 5 to 11 show various modified forms of the apparatus.

Figure 14:
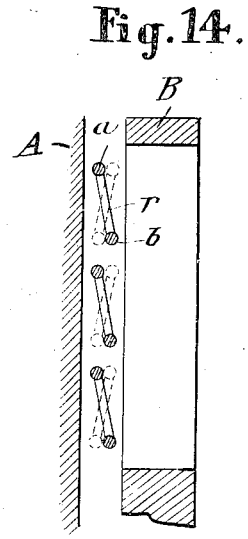
Figure 15:
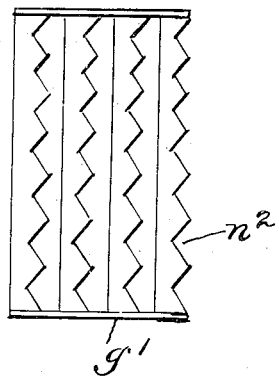
Figure 16:
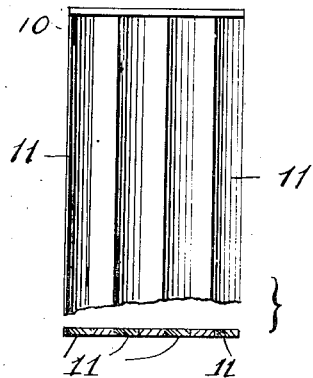

Fig. 14 is an enlarged sectional view showing the mirrors, Fig. 11 and their supporting wires. Fig. 15 shows a notched grid. Fig. 16 shows a striped screen.

Figure 1:
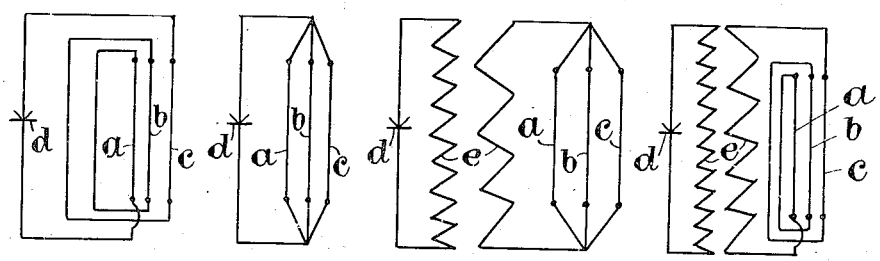
Figures 1 to 4 represent diagrammatically various arrangements of the wires.

In Fig. 1 *a, b* and *c* are 3 wires which are coupled in series and to the source of current or, for instance, to a detector *d* for electromagnetic waves.

Figure 2:
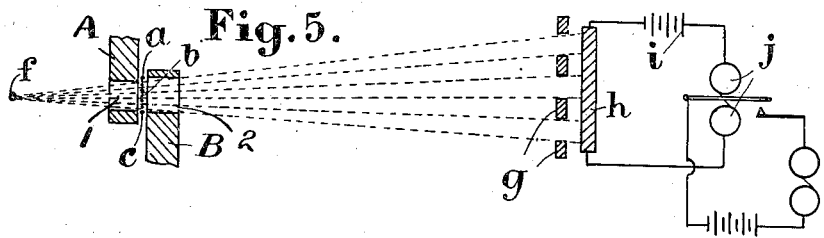
Figure 3:
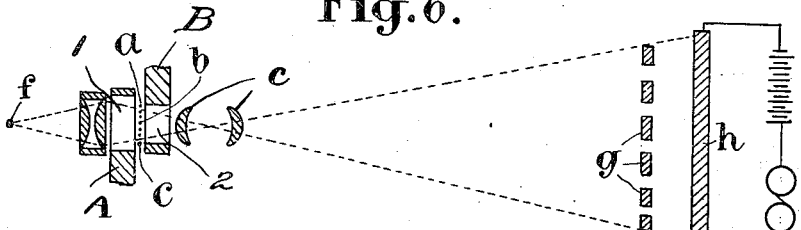
Figure 4:
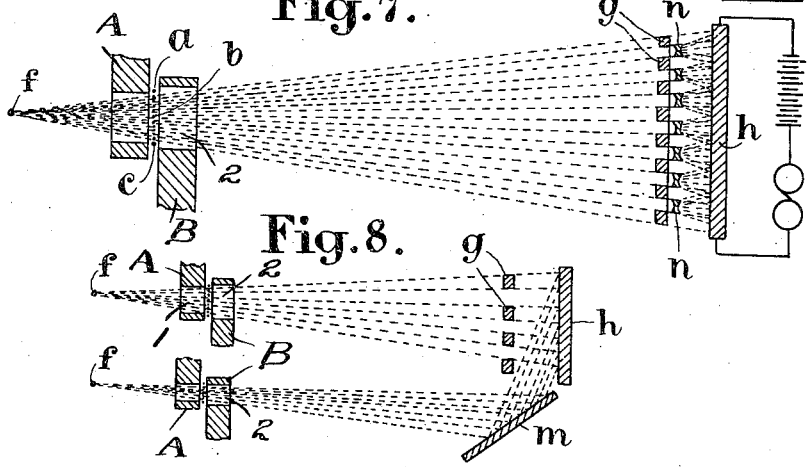

In Fig. 2 the wires are coupled in parallel. In Figs. 3 and 4 inductive coupling is used by means of a transformer *e*. In these 4 examples the current passes in the same direction in all 3 wires; the wires may also be arranged so that the current will pass in opposite directions in the various wires, if only care be taken to make use of the lateral movement of the wire for a combined light effect on the selenium cell. It is simply necessary in some forms of the invention to displace the wires to permit light to pass by them, and in others it is advisable to cause a couple to act in adjacent wires, as hereinafter referred to.

Furthermore it is immaterial how the wires are disposed relatively to each other in the magnetic field, as long as they do not interfere with each other's action.

In the arrangement according to Fig. 5 the light acts directly on the selenium cell. The rays transmitted from the source of light *f* pass by the conducting wires *a, b c* and toward a grid *g*. Behind this grid is the selenium cell *h*. The wires *a, b c* are so arranged in a magnetic field between two magnet poles A and B provided with registering apertures 1 and 2 that, when no current is passing through them, the light rays will fall on the opaque ribs of the grid, and no light will fall on the selenium cell, the wires $a$, $b$, $c$ throwing their shadows on the same. If, however, a current is passing through said wires, the latter will be moved laterally and their shadows consequently be displaced sidewise so as to fall on the ribs of the grid, and now the light rays will fall on the selenium cell. The latter then becomes more conductive and a stronger current will pass from the battery $i$ through the cell and the relay $j$ which operates the desired instrument, clock, etc., in a well known manner.

Instead of using the light directly it may also be caused to pass through lenses or to be reflected by mirrors before it strikes the selenium cell.

In Fig. 6 is illustrated diagrammatically an arrangement of lenses C by which the light effect on the selenium cell is increased. That is to say, the light from the source $f$ is collected and a larger portion is so concentrated by the lenses that a greater quantity of light is caused to be concentrated on the cell than would otherwise be the case were the lenses omitted.

In Fig. 7 is illustrated an arrangement with narrow spreading lenses $n$ behind the grid $g$, whereby the light rays are distributed over the entire surface of the selenium cell.

In Fig. 8 is shown an arrangement in which are used two magnets and two sets of conducting wires, and in which the light rays are transmitted from one apparatus toward a mirror $m$ which reflects them onto those portions of the cell that are not exposed by the other apparatus.

Figure 12:
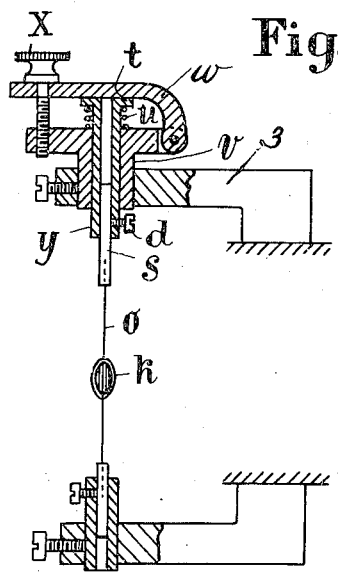
Fig. 12 is a view partly in section of a tensioning means.

It is immaterial whether a direct current or alternate current or interrupted direct current be passed through the conducting wires. If direct current be used, the grid should be so arranged with respect to the light rays that the latter may act during lateral movements of the wires in either direction. If alternate current or interrupted direct current with a given number of periods be used, the tightening of the conducting wires may advantageously be so adapted as to make them oscillate in resonance with the current impulses. Thereby the effect of the latter will be considerably increased. Means for adjusting the tension of the wire are shown in Fig. 12, in which there is an adjustable thimble $v$ mounted in a support 3 to which is hinged an arm $w$ whose free end is held stationary with respect to thimble $v$ by a thumb-screw X. Within the thimble $v$ is a smaller thimble $y$ whose head $t$ is urged against an arm $w$ by a spring $u$. The end of wire $o$ carrying the screen $k$ is soldered or otherwise conductively attached to a short rod $s$ that is fastened in the movable thimble $y$ by a set screw $d$. The lower end of the wire $o$ is held stationary in any suitable support. By adjusting the screw X the tension on the wire $q$, which is in effect under the action of the spring $u$ can be adjusted for resonance.

Since the magnitude of the lateral movement of the wires is dependent on the intensity of current in the wire, quantitative effects may be obtained according to this method, so that the whole may act as a kind of telephone relay. In this case however, the conductive wires must be so disposed relatively to each other and to the grid that a stronger or slighter light effect is obtained on the cell according as the wires move more or less laterally. Further the arrangement may be so made that the grid $g'$, Fig. 15, is provided, for instance, with notches $n^2$, or, that a stripe-colored glass is placed in front of the same, which glass has the greatest opacity of its stripes 10 near the ribs of the grid and the clearness of which increases away from the ribs (Figs. 9 and 16). A greater lateral movement of the wire will thereby allow more light to pass through, than would a slighter movement, and this will then have a corresponding effect on the selenium cell. If therefore a telephone is coupled in series with the cell and a battery, the variations can be heard in the telephone, especially if alternate current or intermittent direct current be passed through the conducting wires. In this manner this invention may also be used as a telephone relay for increasing the distinctness of telephone conversation (at long distances). In this arrangement the grid may also be entirely done away with and be replaced by the darkest stripes of the glass disk which will be of the same service, if they are sufficiently opaque. Fig. 10 illustrates an embodiment in which is used a striped plate $k$ attached to a wire $o$. The light rays passing through the grid $g$ from the source of light $f$ are concentrated on the selenium cell $h$ by means of the lens $n$. Of course there is nothing to prevent the whole from being so arranged that the selenium cell will be exposed when no current is passing through the wires, and that it will be eclipsed when current is passing through the wires. The coupling of the relay will then have to be altered correspondingly.

Figure 13:
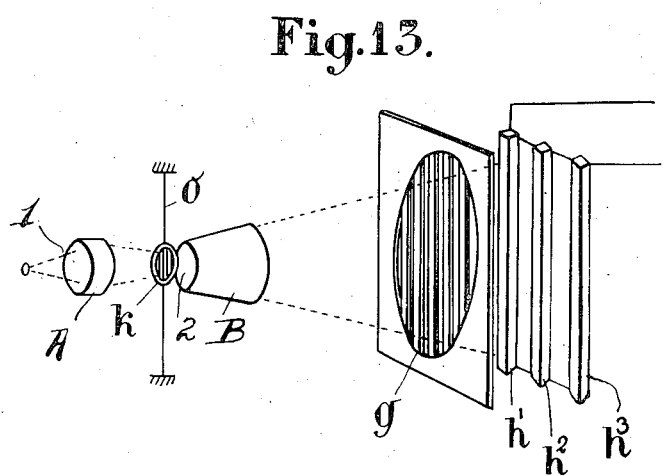
Fig. 13 illustrates the use of a plurality of photo electric cells.
Figure 14:
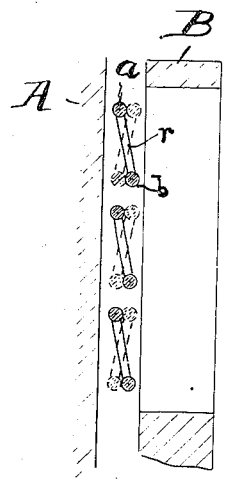

The invention may also be carried out in the manner that small mirrors are attached to the wires reflecting the light rays from a source of light onto the selenium cell. It is then convenient to mount the mirrors between a pair or pairs of wires and to cause a current to pass through the wires of the pair in opposite directions so that they will cause a swinging movement of the mirrors to take place, as shown in Fig. 11. Fig. 13 illustrates a plurality of photo-electric cells $h'$, $h^2$ in conjunction with a grid $g$ and line-screen $k$.

The devices above described are only examples of construction, since the apparatus can be given various forms and be constructed in various ways without departing from the spirit of the invention. It is furthermore immaterial whether they are used as magnets permanent magnets or electromagnets and in what way the same are formed. It is further immaterial whether the conducting wires are thin or thick, flat or round, and what metal they are made of.

Claims:

1. In a relay arrangement, the combination with means for producing an electric field and a wire in said field arranged to be traversed by electric currents; of a local circuit, a photo-electric cell therein and a source of light between which and said cell the wire is arranged, whereby the conductivity of the cell is controlled.

2. In a relay arrangement, the combination with means for producing an electric field, and a plurality of wires arranged to be traversed by electric current in said field; of a local circuit, a photo-electric cell therein, a source of light between which and said cell the wires are arranged, whereby said wires control the illumination of said cell.

3. In a relay arrangement, the combination with means for producing a magnetic field, and a plurality of conductors arranged in said field and to be traversed by electric current; of a local circuit, a plurality of photo-electric cells in said circuit, a source of light between which and said cells the wires are located to control the illumination of the cells.

4. In a relay arrangement, means to produce a magnetic field, a conducting wire in said field, a photo-electric cell opposite said wire, a grid between said wire and cell, and a source of light to illumine said cell, said wire arranged to coöperate with said grid to control the illumination of said cell.

5. In a relay arrangement, means to produce a magnetic field, conducting wires in said field, a photo-electric cell, a grid arranged between the wires and cell, a source of light to illumine said cell, said wires arranged to coöperate with said grid to control the illumination of the cell.

6. In a relay arrangement, means to produce a magnetic field, a conducting wire in said field, a photo-electric cell, a grid between the wire and cell, a source of light to illumine said cell, said wire and grid arranged to control the illumination of said cell, and means at the interspaces of the grid to disperse the light over the surface of the cell.

7. In a relay arrangement, means to produce a magnetic field, parallel connecting wires in said field, a photo-electric cell, a grid between the cell and wires, a source of light to illumine said cell, said wire and grid arranged to coöperate to control the illumination of the cell, and means at the interspaces of the grid to disperse the rays over the cell.

8. In a relay arrangement, means to produce a magnetic field, parallel connecting wires in said field, a photo-electric cell, a grid between the cell and wires, a source of light to illumine said cell, said wire and grid arranged to coöperate to control the illumination of the cell, means at the interspaces of the grid to disperse the rays over the cell, and means to adjust the tension of the wire to resonance of current passing through the wire.

9. In a relay arrangement, the combination with means for producing an electric field, and a plurality of wires arranged to be traversed by electric current in said field; of a local circuit, a photo-electric cell therein, a source of light between which and said cell the wires are arranged, whereby said wires control the illumination of said cell, and means to adjust the tension of the wire to resonance of the current passing through the wire.

10. In a relay arrangement, the combination with means for producing a magnetic field and at least a pair of wires arranged in said field and through which electric current is adapted to pass in opposite directions; of a photo-electric cell, a grid before the cell, and a source of light between which and the grid and the cell the wires are located.

11. The combination with a photo-electric cell; of a source of light arranged to illumine said cell and means to throw a shadow on said cell and means adjacent the cell coöperating with the shadow producing means to gradually illumine the cell when the shadow-producing means is gradually moved laterally.

12. The combination with means to produce separate magnetic fields, of conducting wires in each field, a source of light, a photo-electric cell, a grid between the cell and wires, said grid and wires coöperating to control the illumination of said cell, and means to illumine those portions of the cell behind the grid bars when the wires are displaced in said field.

13. The combination with means to produce separate magnetic fields; of conducting wires in each field, a source of light, a photo-electric cell, a grid between the cell and wires, said grid and wires coöperating to control the illumination of said cell, and means to illumine those portions of the cell behind the grid bars when the wires are displaced in said field, and means to tension the wires to vibrate in synchronism with current passing said wires.

In testimony that I claim the foregoing as my invention, I have signed my name in presence of two subscribing witnesses.

ABRAHAM NILSEN HOVLAND.

Witnesses:
M. E. GULBORENSEN,
RUTH LINDSTROM.